(12) United States Patent
Adams

(10) Patent No.: US 7,025,840 B1
(45) Date of Patent: Apr. 11, 2006

(54) EXPLOSIVE/ENERGETIC FULLERENES

(75) Inventor: Christian Adams, Yalaha, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 51 days.

(21) Appl. No.: 10/620,645

(22) Filed: Jul. 15, 2003

(51) Int. Cl.
*D03D 23/00* (2006.01)

(52) U.S. Cl. ............................... 149/108.2; 149/109.4

(58) Field of Classification Search ............ 149/109.4, 149/108.2; 60/204
See application file for complete search history.

(56) References Cited

U.S. PATENT DOCUMENTS

| | | | |
|---|---|---|---|
| 5,341,639 A * | 8/1994 | Stephens | 60/204 |
| 5,591,422 A | 1/1997 | Hemmi et al. | |
| 5,599,928 A | 2/1997 | Hemmi et al. | |
| 5,601,802 A | 2/1997 | Hemmi et al. | |
| 5,611,824 A * | 3/1997 | Stephens | 44/282 |
| 5,648,523 A | 7/1997 | Chiang | |
| 5,756,726 A | 5/1998 | Hemmi et al. | |
| 5,922,635 A | 7/1999 | Olah et al. | |
| 6,203,814 B1 * | 3/2001 | Fisher et al. | 424/443 |
| 2003/0089893 A1 * | 5/2003 | Niu et al. | 252/500 |
| 2004/0040637 A1 * | 3/2004 | Desilels et al. | 149/108.2 |
| 2004/0136894 A1 * | 7/2004 | Yoshizawa et al. | 423/447.2 |

OTHER PUBLICATIONS

Esfarjani, Keivan, et al., "Band structure and chemical bonding in C58BN heterofullerenes", *Physical Review B*, (Dec. 15. 1994), 17830-17836.

Joswig, Jan-Ole, et al., "Structural and electronic properties of small titanium-carbon clusters (metcars)", *Phys. Chem. Chem. Phys 3*, (2001),5130-5134.

Kraetschmer, Wolfgang, et al., "Fullerite—Neue Modifikationen des Kohlenstoffs", *Physik in unserer Zeit*, (1992), 105-110.

* cited by examiner

*Primary Examiner*—Aileen Felton
(74) *Attorney, Agent, or Firm*—Jeffrey D. Myers; Peacock Myers, P.C.

(57) ABSTRACT

An explosive and method of making comprising one or more fullerene compounds. The fullerenes may be buckyballs, carbon nanotubes, or buckypaper.

21 Claims, No Drawings

EXPLOSIVE/ENERGETIC FULLERENES

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field):
The present invention relates to nitration of fullerenes.

2. Description of Related Art

Fullerenes include $C_{60}$, also known as hentriacontacyclo [29.29.0.0.$^{2,14}$.$0^{3,12}$.$0^{4,59}$.$0^{5,10}$.$0^{6,58}$.$0^{7,55}0^{8,53}$.$0^{9,21}$.$0^{11,20}$.$0^{13,18}$.$0^{15,30}$.$0^{16,28}$.$0^{17,25}$.$0^{19,24}$.$0^{22,52}$.$0^{23,50}$.$0^{26,49}$.$0^{27,47}$.$0^{29,45}$.$0^{32,44}$.$0^{33,60}$.$0^{34,57}$.$0^{35,43}$.$0^{36,56}$.$0^{37,41}$.$0^{38,54}$.$0^{39,51}$.$0^{40,48}$.$0^{42,46}$]hexaconta-1,3,5(10),6,8,11, 13(18), 14,16,19,21,23,25,27,29(45),30,32(44),33,35(43), 36,38(54),39(51),40(48),41,46,49,52,55,57,59-triacontaene, the original "buckyball"—the perfectly spherical molecule consisting of 60 carbon atoms joined by alternating single and double bonds. Certain arrangements of alternating single and double bonds are known as aromatic systems in the field of chemistry, and indeed many of $C_{60}$'s interesting properties are due to this particular bonding arrangement between the atoms. Other buckyballs include $C_{70}$, $C_{76}$, $C_{84}$, and $C_{86}$.

In addition to buckyballs, fullerenes can be made to form long tubes in which the aforementioned spheres form the caps of the tubes, and at present the length of these carbon atom tubes can range up to many tens of microns in length. Indeed these "nanotubes" enjoy the same kind of "aromatic" carbon—carbon bonds as buckyballs, and similarly exhibit many unusual properties including electrical and thermal conductivity, strength, and additional properties. The most recent addition to the family of fullerenes is "buckypaper," which is an agglomeration of nanotubes to form a thin sheet with exceedingly high strength. When properly formulated, such a nanotube matrix exhibits all the thermal conductivity, strength, and other properties of nanotubes, but is also stronger than steel.

Other species of fullerenes are fullerites (systems of doped solid state fullerenes) and fullerides (substitution of metal atoms for one or more carbon atoms) (see W. Krätschmer, et al., Physik in *unserer Zeit* 23 (1992) 105), endohedral fullerenes (atoms encaged in fullerene), exohedral fullerenes (atoms on exterior of fullerene), heterofullerenes (fullerenes in which carbon atoms have been replaced by heteroatoms) (see K. Esfarjani, et al., Phys. Rev. B 50 (1994) 17830; and G.-H. Chen, et al., *Acta Physica Sinica* (Overseas Edition) 6 (1997) 57), and metcars (metallocarbohedrenes, cage-like clusters of transition metal and carbon atoms) (see Jan-Ole Joswig, et al., *Phys. Chem. Chem. Phys.* 3 (2001) 5130).

For purposes of the specification and claims, "fullerene" is defined to include buckyballs, fullerites, fullerides, endohedral fullerenes, exohedral fullerenes, heterofullerenes, metcars, nanotubes, and buckypaper, and functionalized derivatives thereof.

It has not heretofore been appreciated that fullerenes could usefully be made explosive. U.S. Pat. No. 5,648,523, entitled "Fullerene Derivatives as Free-Radical Scavengers", discloses in Example 6 the nitration of $C_{60}$, but with the nitration step being part of an overall greater reaction with fullerene amino complexes as the product. The referenced nitrated reaction intermediate was $C_{60}$ dodecanitrate, or $C_{60}(NO_2)_{12}$ on average. Other patents mentioning nitration of $C_{60}$ are U.S. Pat. No. 5,922,635, entitled "Nanoscale Solid Superacid Catalysts with Pendant Fluoroalkylsulfonic Acid or Fluoro, Perfluoroalkylsulfonic Acid Groups"; U.S. Pat. No. 5,756,726, entitled "Methods of Producing Singlet Oxygen Using Compounds Having Improved Functionalization"; U.S. Pat. No. 5,601,802, entitled "Methods of MRI Enhancement Using Compounds Having Improved Functionalization"; U.S. Pat. No. 5,599,928, entitled "Texaphyrin Compounds Having Improved Functionalization"; and U.S. Pat. No. 5,591,422, entitled "Texaphyrin Compounds Having Improved Functionalization".

The present invention shows that the electrophillic substitution reaction known as nitration can not only be applied to $C_{60}$ fullerenes but also related materials such as nanotubes and nanotube matrices. Furthermore any type of "ordnance" chemical functionality can be added to fullerenes or nanotubes to render an explosive and/or energetic material. Such high strength materials can be layered/formed into the structure or packaging of metals, ceramics, composites, electrical and/or mechanical discrete components. Such components can include active or passive sensors, circuit assemblies, packaging materials, fuselage materials, entire fuselages, wing structures, or other structures to which one wishes to impart explosive or ordnance characteristics.

BRIEF SUMMARY OF THE INVENTION

The present invention is of an explosive, and corresponding method for making same, comprising one or more fullerene compounds. In the preferred embodiment, at least one of the fullerene compounds comprises a CHNO-based explosive or is nitrated or functionalized with a nitro-containing compound. At least one of the fullerene compounds is selected from $C_{60}$ dodeconitrate, other $C_{60}(NO_2)_n$ compounds where n is between 1 and 60, other nitrated fullerene compounds, and fullerene compounds otherwise functionalized with a nitro-containing compound, preferably resulting in an explosive at least approximately 10% nitrogen. At least one of the fullerene compounds may comprise single- or multi-walled carbon nanotubes, preferably a matrix of carbon nanotubes such as buckypaper. The nanotubes may be rendered explosive or energetic prior to forming the carbon nanotubes into the matrix.

The invention is also of ordnance and corresponding method of making comprising the explosive just described. In the preferred embodiment, the ordnance is one or more of bullets, artillery rounds, tank rounds, packaging materials, missiles, fuselages, nano-scale ordnance, micro-scale ordnance, and shell casings. The ordnance may be nano-scale ordnance or micro-scale ordnance, preferably used to protect valuable assets upon detection of tampering.

Objects, advantages and novel features, and further scope of applicability of the present invention will be set forth in part in the detailed description to follow, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

Not Applicable.

DETAILED DESCRIPTION OF THE INVENTION

The present invention is of explosive fullerene materials comprising one or more of carbon nanotubes, carbon nanotube derivatives, carbon nanotube functionalization, carbon nanotube matrices, and carbon buckyball material. In the preferred embodiment, the explosive materials comprise a CHNO (Carbon Hydrogen Nitrogen Oxygen)-based explosive. Inclusion of the aforementioned materials into any structures or applications can render such a structure or application into ordnance.

This invention renders carbon fullerene buckyballs or carbon nanotubes into an explosive and/or energetic material by virtue of the addition of CHNO chemical functionality. Specifically this embodiment involves carbon fullerene buckyballs or carbon nanotubes, either individually or as a matrix, whereby the material(s) are processed through a chemical reaction to add CHNO explosive functionality to the molecular structure(s). The chemical reaction involves the application of CHNO explosive functionality to carbon fullerene buckyballs or carbon nanotubes (or any candidate fullerene aromatic chemical system). For example, nitration chemistry comprises various mixtures of nitric acid and sulfuric acid, with or without the presence of a catalyst (the catalyst is preferably a transition metal such as copper or any other material which exhibits favorable catalytic properties in this chemical reaction); whereby the reaction causes the addition of $NO_2$ functional groups to the chemical system. Alternatively, nitration can occur by using a pure nitronium salt such as $NO_2^+BF_4^-$, with or without the presence of a catalyst (the catalyst is preferably a transition metal such as copper or any other material which exhibits favorable catalytic properties in this chemical reaction), which causes the addition of $NO_2$ functional groups to the chemical system. Alternatively, this embodiment involves the addition any CHNO explosive functional group to the candidate carbon fullerene buckyball or carbon nanotube material. Other nitrated functional groups include nitrated methyl, ethyl, propyl, n-propyl, butyl, t-butyl, n-butyl, or longer chain hydrocarbons which have been nitrated or have CHNO explosive functionality present in their structure made (either before addition to the carbon nanotube or after), nitrated aromatic ring systems, such as nitro benzene, di-nitro benzene, or tri-nitro benzene, any nitrated hydrocarbon or nitrated functionalization added to the molecular structure of the carbon nanotube, other nitrated carbon buckyballs, or any CHNO explosive chemical functionality. Any such addition renders the nanotube into a CHNO-based ordnance material. Examples of methods to provide such functionalization include electrochemical reduction of aryl diazonium salts and using in situ generated diazonium compounds.

The invention can usefully employ either or both of single-walled nanotubes and multi-walled nanotubes. In multi-walled nanotubes there are multiple layers of carbon nanotubes all within each other of increasingly larger diameter. Multiwalled nanotubes almost form an onion-like structure, whereby the outermost layer is ordinarily the only part receiving chemical functionality (e.g., any energetic nitro-based functionality, such as TNT (tri nitro toluene), HMX (cyclotetramethylenetetranitramine), or RDX (hexahydro-1, 3,5-trinitro-1,3,5-triazine)).

The resultant ordnance material may be formed by any chemical reaction previously described either before or after a carbon nanotube matrix is deposited onto a candidate surface. Alternatively the ordnance material may be formed into thin sheets which can be laminated onto other surfaces. Alternatively thin sheets of ordnance material may be laminated together to form greater superstructures with various degrees of rigidity and/or various degrees of explosiveness. Alternatively nitrated carbon fullerene buckyballs (or any buckyballs sufficiently modified by the addition of CHNO chemical functionality) may be used in a purified form as an ordnance material, or in combination with other materials to provide variation on the stability or ordnance characteristics ultimately imparted by the presence of varying quantities of the chemically modified carbon fullerene buckyballs.

Any carbon nanotubes, carbon nanotube sheets, carbon nanotube matrices, or carbon nanotube sheet composite structures, or carbon buckyballs sufficiently modified by the addition of CHNO explosive chemical functionality may be used in the structure or packaging of metals, ceramics, composites, electrical and/or mechanical discrete components; including active or passive sensors, circuit assemblies, packaging materials, fuselage materials, entire fuselages, wing structures, or any other structure to which one wishes to impart explosive or ordnance characteristics.

In order to process ordnance functionalized nanotubes into composite structures that are both strong and energetic it is necessary to choose a binder material that holds the nanotubes together. This binder material itself should be reactive. Such a binder material preferably contains nitrocellulose either exclusively or in part, but may also contain any other reactive polymer in addition to or instead of nitrocellulose. Because the nanotubes described herein are functionalized, there is a propensity for the nanotubes to adhere to the binder material on a molecular level. Non-functionalized nanotubes have a propensity to slip out of their positions (due to the smooth graphitic surface of the non-functionalized nanotubes) when the entire matrix is subject to violent strain or pull testing. Additional quantities of non-functionalized nanotubes may be added to the nitrocellulose or similar binding agent to change the ordnance characteristics of the resultant material. Similarly, other materials may be added to the mixture to modify the following parameters:

Tensile strength
Specific modulus
Burn rate
Energy per unit weight
Shockwave capacity
Energy release rate
Safety issues All these parameters are subject to modification according to end-use requirements. These modifications may be accomplished through different additions of the following:

Non-functionalized carbon fibers
Non-functionalized nanotubes

Different ordnance materials/chemicals added (e.g., ammonium nitrate or aluminum powder)

Modifications in density and/or overall structure (foam vs. layers vs. solid).

The addition or substitution of buckypaper sufficiently modified by the addition of CHNO explosive chemical functionality in the construction of bullets, artillery, and even entire missiles and fuselages adds additional ordnance effectiveness to the benefiting products. Use of the present invention dramatically increases the ordnance load by employing the inventive material in one or more aspects of the superstructure or fuselage. Additionally, nano-scale or micro-scale ordnances can be inserted into key systems for technology protection in case of tampering, detection of burglary, etc. Bullets may be manufactured from this material that can not only withstand the firing process from the firearm, but also explode on impact with the proper detonation mechanism/construction. Shell casings found in bullets, artillery, and even tanks rounds may be rendered obsolete in some cases as the material(s) described herein obviates the need for such casings. The construction of these items without casings reduce weight, increase ordnance load per unit weight, and increases safety for those who may otherwise be in contact with hot munition shells being ejected after use.

Performance of any system or sub-system that benefits from ordnance capability is significantly enhanced by the inventive materials described herein. This is because of the lightweight combination of strength and durability, as well as electrical and thermal conductivity inherent to the inventive material. The inventive material may be formulated so that it is not detectable by a layman's visual inspection.

INDUSTRIAL APPLICABILITY

The invention is further illustrated by the following non-limiting example.

EXAMPLE 1

The following procedure was followed:

Equip a two-necked reaction flask A (50 mL) with a vertical dropping funnel with a stopcock on one neck and a connecting gas bubbling tube on the other neck.

Attach a gas-bubbling tube with a drying tube ($CaCl_2$), insert into a second two-necked reaction flask B. Attach the other neck of flask B with a bubbling tube, and extend into a trapping flask containing aqueous sodium hydroxide solution (2N).

To minimize the back-flow of moisture from alkaline solution, install a drying tube ($CaCl_2$) in between the flask B and the trapping flask. Flow a steady inert gas ($N_2$) starting from the top of dropping funnel, through the reaction flasks A and B in sequence, into the alkaline solution in the trapping flask.

Charge both the dropping funnel (connected to reaction flask A) with concentrated $HNO_3$ (10 mL), and add either copper powder (10 g) or sodium nitrite ($NaNO_2$, 10 g). Place a solution of $C_{60}$ fullerene (500 mg) in benzene (50 mL, dried over Na) in reaction flask B. Adjust the inert gas bubbling through the $C_{60}$ solution in the flask B to a flow rate of 5 mL per min. Deoxygenate the fullerene solution for at least 5 min prior to the reaction.

Add concentrated $HNO_3$ solution dropwise to flask A containing the sodium nitrite solid. Brown fume will be produced immediately upon the contact of the concentrated $HNO_3$ with $NaNO_2$. A steady flow of $N_2$ will bubble the brown fume through the $C_{60}$ solution in flask B.

The purple solution of $C_{60}$ will change to orange-red progressively within 15 minutes of the reaction. Stir the mixture for an additional 2 hours at ambient temperature. If $C_{60}$ is successfully nitrated a dark brown-red solution with suspended solids will be generated.

At the end of reaction remove excessive nitrogen dioxide ($NO_2$) by bubbling $N_2$ through the trapping solution (flask B). Separate benzene from the product solution using reduced pressure evaporation to yield dark brown solids. Suspend the solids in anhydrous n-hexane and separate the solids from the n-hexane solution by centrifugation. Dry the product in a vacuum oven at 40° C. to afford brown solids of polynitro fullerene derivatives, $C_{60}(NO_2)_r$ (n=12 on average) (650 mg).

Polynitro compound exhibits appreciable solubility in common organic solvents such as THF (tetrahydrofuran), DMF (dimethylformamide), $CH_2 Cl_2$, $CH_3OH$ and DMSO (dimethyl sulfoxide).

The reaction product of the $C_{60}$ was a vivid orange-red after drying. Immediately after the ½ gram of $C_{60}$ fullerene material was reacted approximately 1/10th of a gram of buckypaper was treated using the same setup and fresh chemistry. It is expected that the nitration reaction is equally applicable to other fullerene systems such as nanotubes and nanotube matrices. The benzene-buckypaper reaction, however, exhibited different colors when compared to the $C_{60}$. Where the $C_{60}$ formed a purple solution with benzene, the benzene-buckypaper solution was clear. Where the $C_{60}$ benzene solution changed from purple to orange, the benzene-buckypaper changed from clear to green when the first nitrous oxide passed through the reaction vessel, and only after several hours did the hue change from green to amber orange. It is suspected that the green color indicates a contamination resulting from the iron catalyst used in the manufacture of the buckypaper, or some other contamination in the system. Furthermore, the reaction product of the buckypaper did not exhibit any color change from the original material other than a barely perceptible orange hue, perhaps a byproduct of the reaction conditions.

Subsequent analyses using FTIR (Fourier transform infrared) spectroscopy of the nitrated $C_{60}$ revealed strong peaks corresponding to N=O and N—O (double bond and single bond respectively), where the non-nitrated $C_{60}$ had no such signals. Analysis of the nitrated buckypaper, however, showed only a slight presence of nitration when compared to the non-nitrated analog. To corroborate this FTIR data a sample of the nitrated buckypaper was placed in an XPS (X-ray photoelectron spectroscopy) chamber for elemental characterization and a similar faint peak for nitrogen was observed: on the order of 1–2 atomic percent of the element.

The degree of nitration is frequently used to describe the reactivity of candidate ordnance materials, and is expressed as "% nitrogen." For example, TNT (tri-nitro toluene) is 18.5% N. The fullerene nitration reaction product ($C_{60}(NO_2)_{12}$) mentioned above results in a 13% nitrogen product.

The following criteria must generally be met in order for a substance to be categorized as an explosive: (1) Production of gas; (2) Production of heat; and (3) Reaction propagation velocity faster than bulk sound speed. The nitrated $C_{60}$ material and nitrated buckypaper materials were detonated using a model rocket engine bridgewire and a power supply.

Most explosives produce between 500 and 1000 $cm^3$ of gas per gram of material. Assuming that the following chemical reaction occurs, $C_{60}(NO_2)_{12} \Rightarrow 6N_2 + 24CO + 36C$, it is calculated that one gram of nitrated $C_{60}$ will produce just over 500 cm$^3$ of gas.

The first two criteria (production of gas and heat) were met with the $C_{60}(NO_2)_{12}$. From both chemical analysis data and detonation efforts, it was determined that the buckypaper is neither reactive nor susceptible to nitration, but it is also known that similar problems were encountered when trying to force resin between the carbon nanotube fibers found in the matrix. By applying pressure to the resin injection system this problem was overcome, and similar efforts may be applied during the nitration reaction so that this problem is overcome. Alternatively, the nitration reaction may be applied to the nanotubes prior to assembly into buckypaper, thus eliminating the need for elaborate pressurized chemical reaction vessels.

The preceding example can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

The invention claimed is:

1. An explosive comprising one or more nanotube compounds comprised of about 80% or greater nanotubes by weight and wherein at least one of said one or more nanotube compounds is functionalized with a nitro-containing group.

2. The explosive of claim 1 wherein at least one of said one or more nanotube compounds comprises a CHNO-based explosive.

3. The explosive of claim 1 comprising at least approximately 10% nitrogen.

4. The explosive of claim 1 wherein at least one of said one or more nanotube compounds comprises single-or multi-walled carbon nanotubes.

5. The explosive of claim 4 wherein at least one of said one or more nanotube compounds comprises a matrix of carbon nanotubes.

6. The explosive of claim 5 wherein said matrix comprises buckypaper.

7. The explosive of claim 5 wherein said nanotubes are rendered explosive or energetic prior to forming said carbon nanotubes into said matrix.

8. Ordnance comprising the explosive of claim 1.

9. The ordnance of claim 8 wherein said ordnance comprises a member selected from the group consisting of bullets, artillery rounds, tank rounds, packaging materials, missiles, fuselages, nano-scale ordnance, micro-scale ordnance, and shell casings.

10. The ordnance of claim 9 wherein said ordnance comprises a member selected from the group consisting of nano-scale ordnance and micro-scale ordnance, and said ordnance protects valuable assets upon detection of tampering.

11. A method of making an explosive comprising providing one or more nanotube compounds comprised of about 80% or greater nanotubes by weight and rendering at least one of the compounds explosive with a nitro-containing group.

12. The method of claim 11 wherein the rendering step comprises rendering at least one of the one or more nanotube compounds into a CHNO-based explosive.

13. The method of claim 11 wherein the rendering step comprises nitrating or functionalizing with a nitro-containing compound at least one of the nanotube compounds.

14. The method of claim 13 wherein the explosive comprises at least approximately 10% nitrogen.

15. The method of claim 11 wherein at least one of the one or more nanotube compounds comprises single-or multi-walled carbon nanotubes.

16. The method of claim 15 wherein at least one or more nanotube compounds comprises a matrix of carbon nanotubes.

17. The method of claim 16 wherein the matrix comprises buckypaper.

18. The method of claim 16 additionally comprising the step of forming the carbon nanotubes into a matrix after the rendering step.

19. A method of making ordnance comprising the following steps of claim 13 and forming the explosive into ordnance.

20. The method of claim 19 wherein the ordnance comprises a member selected from the group consisting of bullets, artillery rounds, tank rounds, packaging materials missiles, fuselages, nano-scale ordnance, micro-scale ordnance, and shell casings.

21. The method of claim 20 wherein the ordnance comprises a member selected from the group consisting of nano-scale ordnance and micro-scale ordnance, and the ordnance protects valuable assets upon detection of tampering.

* * * * *